United States Patent [19]
Choi

[11] Patent Number: 5,680,499
[45] Date of Patent: Oct. 21, 1997

[54] TIME-LAPSE VIDEO CASSETTE RECORDER

[75] Inventor: Nag-eui Choi, Ansan, Rep. of Korea

[73] Assignee: Samsung Electronics Co., Ltd., Kyungki-do, Rep. of Korea

[21] Appl. No.: 414,220

[22] Filed: Mar. 31, 1995

[30] Foreign Application Priority Data

Mar. 31, 1994 [KR] Rep. of Korea .................. 94-6814

[51] Int. Cl.$^6$ .................. H04N 5/92; H04N 5/76
[52] U.S. Cl. .................. 386/68; 386/74; 386/72; 386/80; 386/81
[58] Field of Search .................. 360/69, 71, 73.01, 360/73.04, 73.09, 73.11, 73.12, 76, 37.1, 64, 61; 358/335, 319; 386/1, 46, 72, 74, 80, 81, 68, 8; H04N 5/92

[56] References Cited

U.S. PATENT DOCUMENTS

| | | |
|---|---|---|
| 4,238,776 | 12/1980 | Tanaka . |
| 4,633,335 | 12/1986 | Yamamoto et al. . |
| 4,658,319 | 4/1987 | Tripp et al. . |
| 4,675,752 | 6/1987 | Higashi et al. . |
| 4,771,345 | 9/1988 | Watanabe . |
| 4,796,104 | 1/1989 | Ito et al. . |
| 5,396,378 | 3/1995 | Yokoyama . |
| 5,432,648 | 7/1995 | Watanabe et al. . |
| 5,452,144 | 9/1995 | Kawakami . |

*Primary Examiner*—Thai Tran
*Assistant Examiner*—Aung S. Moe
*Attorney, Agent, or Firm*—Sughrue, Mion, Zinn, Macpeak and Seas

[57] ABSTRACT

A time lapse video cassette recorder (VCR) includes a video head, a control head for selectively recording and reproducing a control pulse, a capstan motor moving a magnetic tape at a predetermined speed, a video signal processing circuit processing a video signal which is recorded or reproduced by the video head, a horizontal frequency corrector correcting a horizontal frequency in sync with the recording stop signal to prevent the change of the horizontal frequency which is caused by the deviation of a travel angle of the video head during 12H/24H recording, and a gain controller controlling a control gain of the capstan motor according to rotation speed of the capstan motor. The video head, in an exemplary case, is a dual-azimuth quad head. The time-lapse VCR recorder also includes and analog servo for generating a recording stop signal, a recording control pulse suitable for a time-lapse operation, a head switching pulse, a rotary switching pulse and a head amplifier switching pulse, for providing a control voltage to the capstan motor, and for controlling the phase of the capstan motor by reading the control pulse. The time-lapse VCR, thus, can be made compatible with a conventional VHS VCR. As a result, a stronger market can be created and product development time can be reduced, since the same accessories and established product lines used for the conventional VHS VCR are employed.

16 Claims, 10 Drawing Sheets

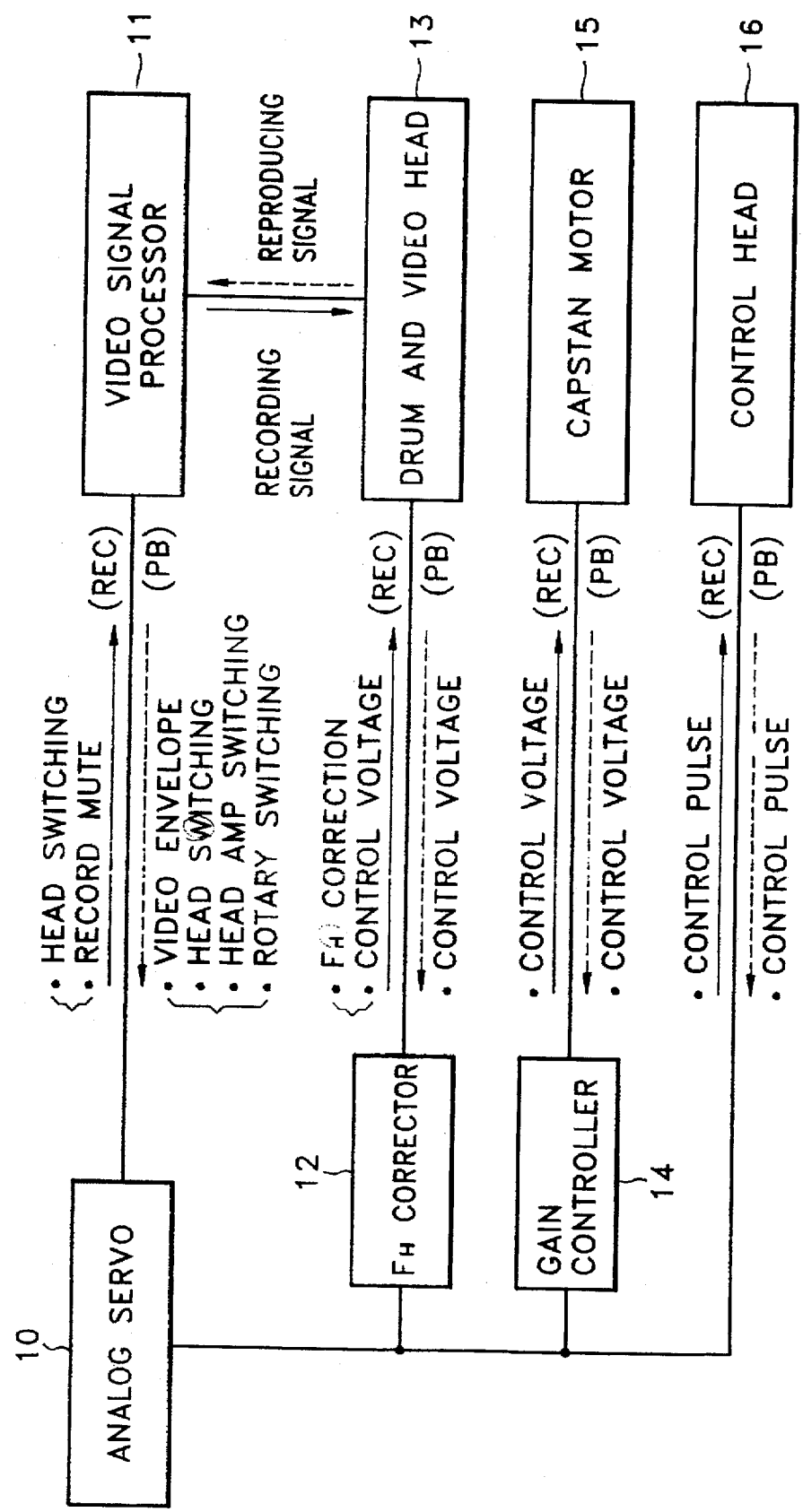

FIG. 4A
FIG. 4B
FIG. 4C
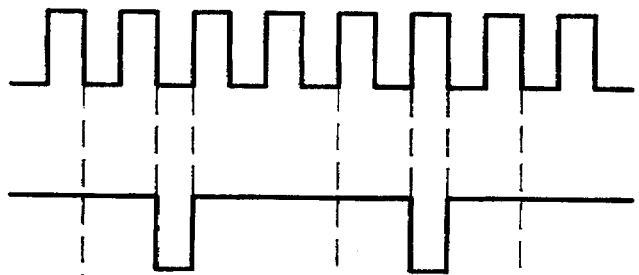
FIG. 5 (PRIOR ART)
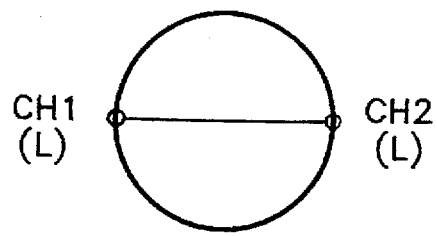
FIG. 6 (PRIOR ART)
| MODE | SPEED | HEAD | REMARKS |
|---|---|---|---|
| REC | 2H | L, L | SAME AZIMUTH RECORDING |
|  | 12H | L, L | SAME AZIMUTH RECORDING |
|  | 24H | L, L | SAME AZIMUTH RECORDING |
| PB | 2H | L, L | — |
|  | 12H | L, L | — |
|  | 24H | L, L | — |
| STILL | — | L, L | FIELD STILL |
| SLOW | — | L, L | — |
| SEARCH | — | L, L | — |

FIG. 7A
(PRIOR ART)
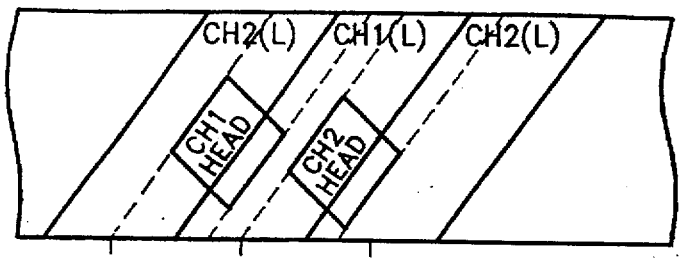
FIG. 7B
(PRIOR ART)
FIG. 7C
(PRIOR ART)
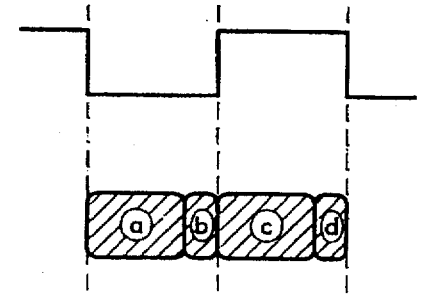
FIG. 8A
(PRIOR ART)
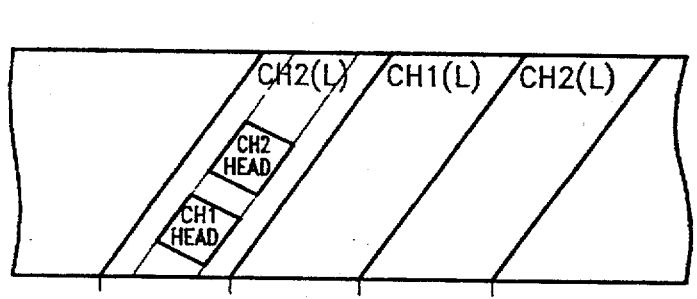
FIG. 8B
(PRIOR ART)
FIG. 8C
(PRIOR ART)
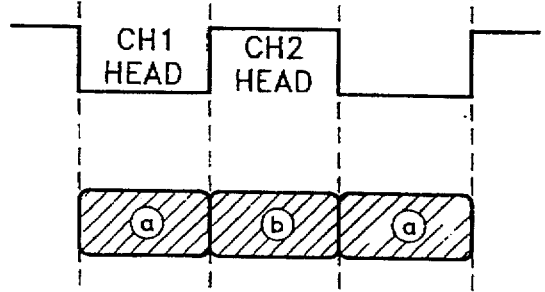

FIG. 11
| MODE | SPEED | HEAD | REMARKS |
|---|---|---|---|
| REC | 2H | R', L' | AZIMUTH RECORDING |
| REC | 12H | R', L' | AZIMUTH RECORDING |
| REC | 24H | R', L' | AZIMUTH RECORDING |
| PB | 2H | R', L' | — |
| PB | 12H | R, R', L, L' | OPTIMUM HEAD SELECTION |
| PB | 24H | R, R', L, L' | OPTIMUM HEAD SELECTION |
| STILL | — | L, L' | FIELD STILL |
| SLOW | — | L, L', R' | — |
| SEARCH | — | R, R', L, L' | OPTIMUM HEAD SELECTION |
FIG. 12A
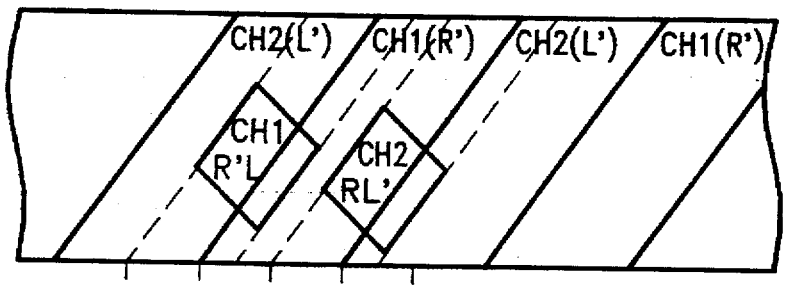
FIG. 12B
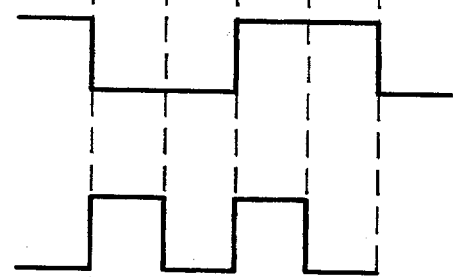
FIG. 12C
FIG. 12D
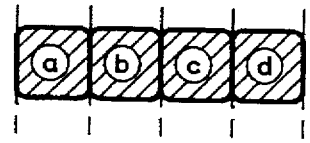

FIG. 13A
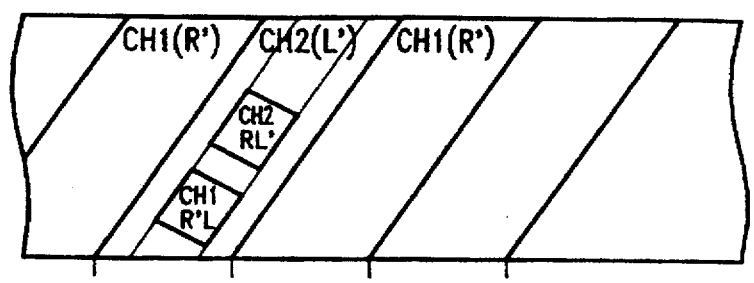
FIG. 13B
FIG. 13C
FIG. 13D
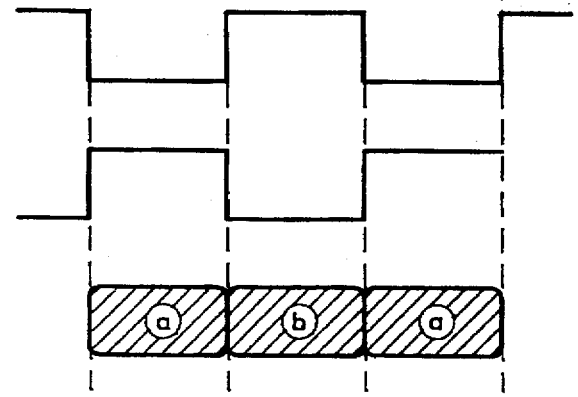
FIG. 14A
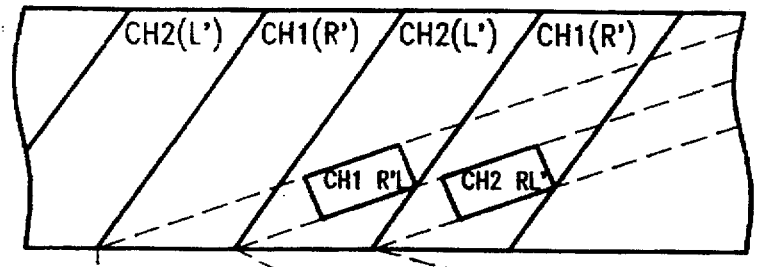
FIG. 14B
FIG. 14C
FIG. 14D
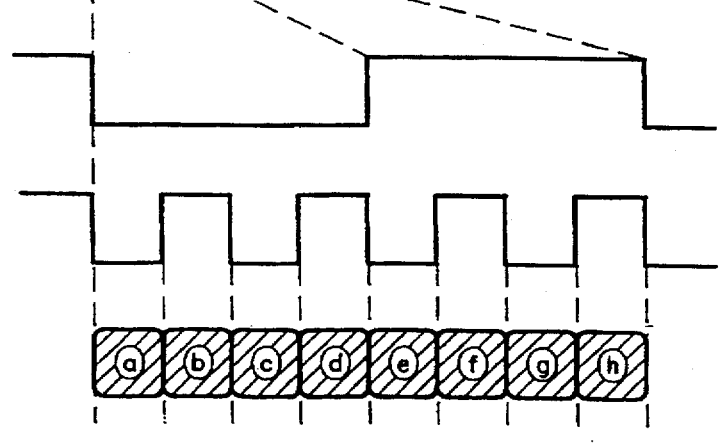

| MODE | S1 | S2 | S3 | S4 |
|---|---|---|---|---|
| SLOW 12H/24H REC | OFF | OFF | OFF | ON |
| (LP,EP) PB/REC | OFF | OFF | OFF | OFF |
| (SP) PB/REC | ON | OFF | OFF | OFF |
| (EP) SEARCH | ON | ON | OFF | OFF |
| (SP,LP) SEARCH | ON | ON | ON | OFF |

TIME-LAPSE VIDEO CASSETTE RECORDER

BACKGROUND OF THE INVENTION

1. Field of the Invention

The present invention relates to a time-lapse video cassette recorder and, more specifically, to a time-lapse video cassette recorder performing VHS-compatible recording, reproducing and trick-play functions by employing a dual-azimuth quad head.

The instant application is based on Korean Patent Application No. 94-6814, which is incorporated herein by reference for all purposes.

2. Description of Related Art

A time-lapse video cassette recorder (VCR) can generally record for a maximum of 24 hours and is often used in conjunction with a monitoring camera for security purposes. FIG. 1 shows a servo portion of a conventional time-lapse VCR, wherein a software, e.g., a digital, servo 1 generates, by means of software, a head switching signal, a record stop (mute) signal, a horizontal frequency ($F_H$) correction signal, drum and capstan motor control voltages, and a recording control pulse. A video signal processor 2 processes a recorded or reproduced video signal while a drum and video head 3 records or reproduces the video signal by rotating the same azimuth quad head at a proper speed. A capstan motor 4 makes a tape travel at a predetermined speed. Additionally, a control head 5 records or reproduces a signal having a period suitable for operation of the time-lapse system.

So-called 12H/24H where 12H denotes 12 hour and 24H denotes 24 hour, time-lapse recording according to the construction of the servo portion shown in FIG. 1 is performed as follows:

(a) Capstan motor 4 is slowly revolved at 1/7 speed or 1/13 speed for 12-hour and 24-hour recording, respectively, with the reference speed being taken as the standard play (SP) speed;

(b) The record stop (mute) signal is provided to video signal processor 2 to prevent an overlapped recording phenomenon caused by drum 3 revolving at 1800 rpm (e.g., VHS format);

(c) Next, the record (mute) stop signal provided to the video signal processor 2 changes its logic level, and the next field image signal is recorded according to a field sampling method; and (d) In the 12H/24H reproducing mode or a multi-function mode (e.g., still or search), the recording and reproducing operations proceed using the same azimuth so that noise generation by the azimuth loss can be prevented.

However, there are many disadvantages in the above-described conventional time-lapse VCR. First, it is not compatible with a general VHS VCR format, i.e., a general magnetic tape cannot be reproduced due to the azimuth loss caused by using the same azimuth head. In addition, a magnetic tape recorded by the time-lapse VCR cannot be reproduced using a conventional VHS VCR. Furthermore, even when there is no significant azimuth loss, the use of the 39 μm head associated with the time-lapse VCR produces a 19 μm guard band which generates high noise levels. Moreover, when 2H-reproducing is performed after recording in a selected 12H/24H mode, the carrier frequency of the audio signal is raised by a factor of 6 or 12 times, respectively, thus speeding up the audio portion of the recording so that it is difficult to recognize its content.

SUMMARY OF THE INVENTION

The present invention was motivated by a desire to eliminate the problems associated with prior art time-lapse VCR.

One object according to the present invention is to provide a time-lapse video cassette recorder compatible with a VHS VCR by employing an analog servo.

Another object according to the present invention is to provide a time-lapse VCR employing a dual-azimuth quad head. According to one aspect of the present invention, product development time and expense can be minimized by minimizing the component variations between conventional and time-lapse VCRs.

These and other objects, features and advantages according to the present invention are provided by a time-lapse video cassette recorder, which includes:

a video head including a dual-azimuth quad head;

a control head for selectively recording and reproducing a control pulse;

a capstan motor moving a magnetic tape at a predetermined speed;

a video signal processing circuit processing a video signal which is recorded or reproduced by the video head;

a servo for generating a recording stop signal, a recording control pulse suitable for a time-lapse operation, a head switching pulse, a rotary switching pulse and a head amplifier switching pulse, for providing a control voltage to the capstan motor, and for controlling the phase of the capstan motor by reading the control pulse;

a horizontal frequency corrector for correcting a horizontal frequency in sync with the recording stop signal so as to prevent the change of the horizontal frequency which is caused by the deviation of a travel angle of the video head during 12H/24H recording; and a gain controller controlling a control gain of the capstan motor according to rotation speed of the capstan motor.

BRIEF DESCRIPTION OF THE DRAWINGS

The above objects and advantages of the present invention will become more apparent by describing in detail preferred embodiments thereof with reference to the attached drawings in which:

FIG. 2 is a block diagram showing a servo portion used in a time-lapse VCR according to the present invention;

FIGS. 4A–4C are waveform diagrams showing a recording timing chart of the 12H mode;

FIG. 5 is a diagram for illustrating the construction of a video head of the conventional time-lapse VCR of FIG. 1;

FIG. 6 shows the switching logic of the video head shown in FIG. 5;

FIGS. 7A–7C are diagrams for illustrating the reading out of a video signal during a 12H reproducing mode, according to the movement of each head in FIG. 1;

FIGS. 8A–8C are diagrams for illustrating the reading out of a video signal during a still reproducing mode, according to the movement of each head in FIG. 1;

FIG. 11 shows the switching logic of the video head shown in FIG. 10;

FIGS. 12A–12D are diagrams for illustrating the reading out of a video signal during a 12H reproducing mode, according to the movement of each head in FIG. 2;

FIGS. 13A–13D are diagrams for illustrating a step of reading out a video signal during a still reproducing mode, according to the movement of each head in FIG. 2;

FIGS. 14A–14D are diagrams for illustrating the reading out of a video signal during a searching mode, according to the movement of each head in FIG. 2;

DETAILED DESCRIPTION OF THE INVENTION

Figure 1:
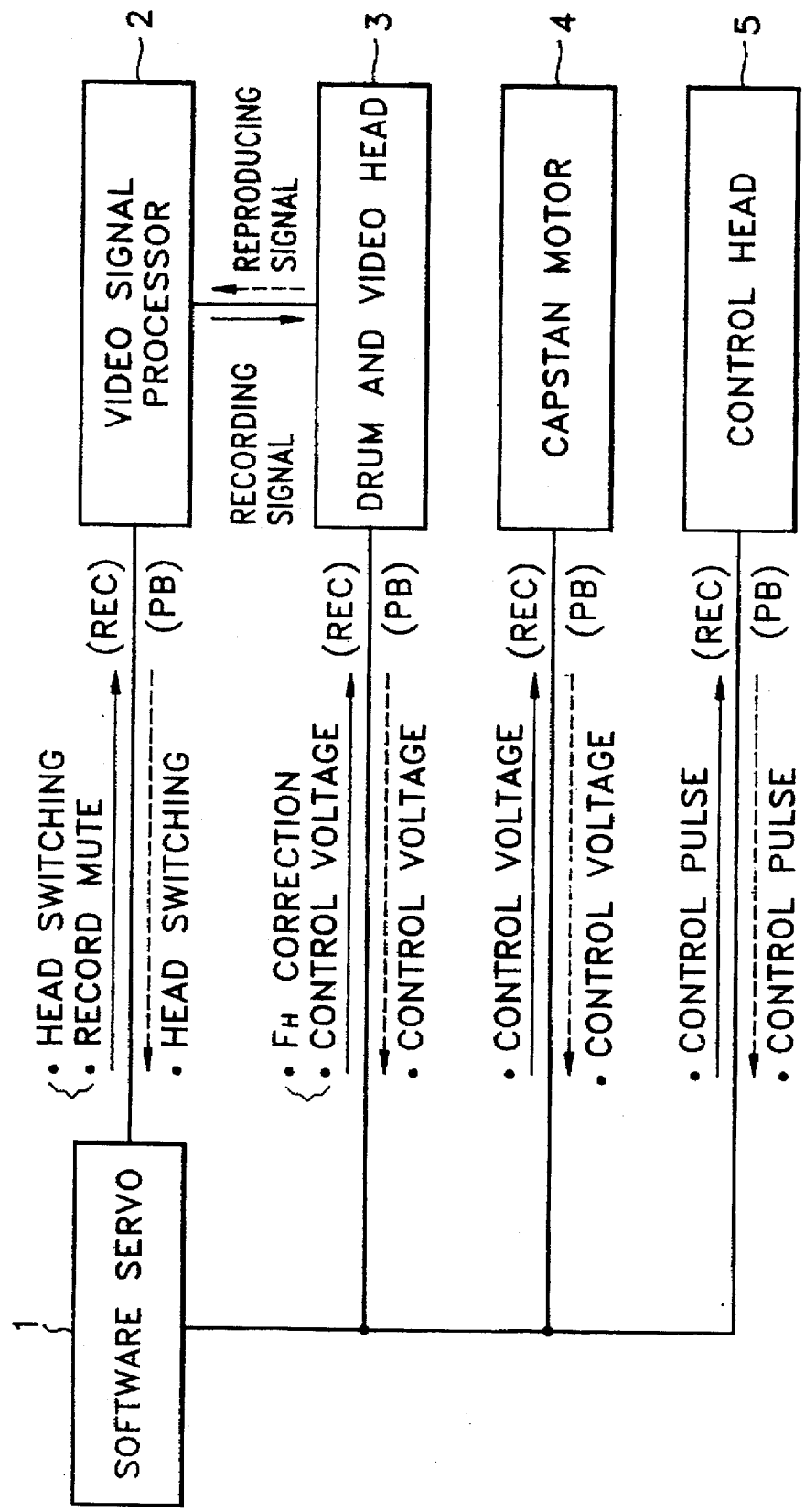
FIG. 1 is a block diagram showing a servo portion used in a conventional time-lapse VCR.

A servo portion of the time-lapse VCR, shown in FIG. 2, is composed of an analog servo 10, a video signal processor 11, an $F_H$ corrector 12, a drum and video head 13, a gain controller 14, a capstan motor 15 and a control head 16.

During operation, analog servo 10 generates a record stop (mute) signal and a control pulse for recording which is suitable for time-lapse operation. Advantageously, analog servo 10 generates a head switching signal and a rotary switching signal which enable the reading of an optimum video signal by properly selecting the heads of the dual-azimuth quad head. Furthermore, analog servo 10 provides a control voltage to capstan motor 15 and controls the phase of capstan motor 15 by reading the control pulse recorded via control head 16.

Video signal processor 11 processes a recorded or reproduced video signal. $F_H$ corrector 12 corrects the horizontal frequency $F_H$ in sync with the record stop (mute) signal so as to prevent skewing, which is generated due to an incorrect horizontal frequency caused by the deviation of the travel angle of a head during 12H/24H recording. It will be appreciated that in systems employing a drum and video head 13, i.e., a dual-azimuth quad head, only the video head in which recording pattern and azimuth are the same can read a recorded signal. Gain controller 14 controls the gain of capstan motor 15 according to the rotary speed of the capstan motor 15. Capstan motor 15 revolves, through proper gain control, from the lower speed of the 12H/24H mode to a searching speed. Control head 16 records or reproduces the control pulse having a period suitable for the time-lapse VCR.

Figure 3A:
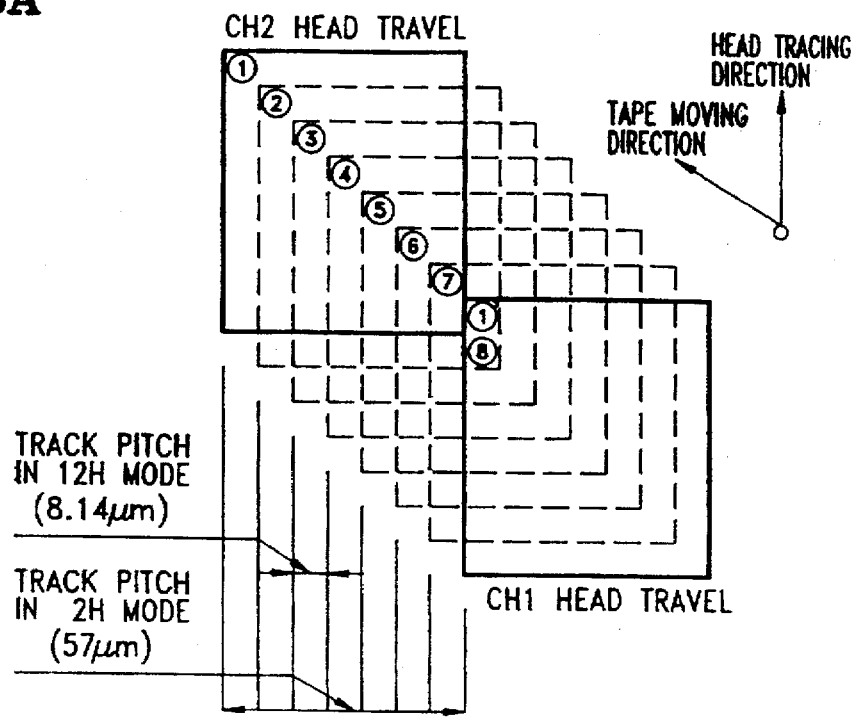
FIGS. 3A–3J are diagrams for illustrating a field sampling model of the time-lapse VCR shown in FIG. 2.
Figure 3B:
Figure 3C:
Figure 3D:
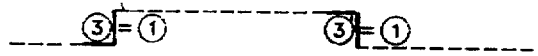
Figure 3E:
Figure 3F:
Figure 3G:
Figure 3H:
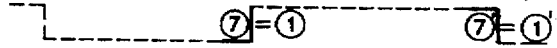
Figure 3I:
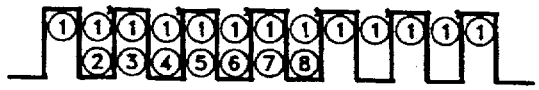
Figure 3J:
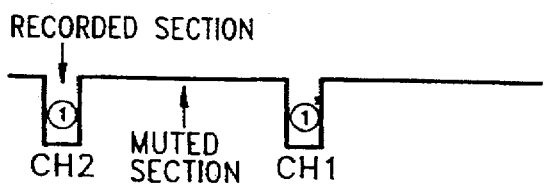

FIGS. 3A–3J are diagrams for illustrating a field sampling mode of operation of the time-lapse VCR shown in FIG. 2, wherein FIG. 3A represents the travel of a video head while FIGS. 3B–3H represent real head switching during travel of the video head. Additionally, FIG. 3I illustrates a compressed head switching pulse while FIG. 3J illustrates a compressed recording (mute) stop signal. Preferably, in an exemplary case wherein the tape is a T-120 tape, track pitch is 57 µm for 2H recording and 8.14 µm for 12H recording.

For example, to record for 12 hours (or 24 hours) on a T-120 tape, capstan motor 15 is first rotated at 1/7 (or 1/13) speed with respect to the SP mode so that the tape travels for 12 hours (or 24 hours). Thus, the tape travels at a very lower speed, while the drum still revolves at 1800 rpm, i.e., the same as the VHS format speed, so that a large amount of overlap between neighboring tracks is generated. To eliminate this problem, the field sampling method or mode is adopted. According to the field sampling method, the recording stops until the tape moves to a section in which overlap recordings, i.e., tracks, are not generated. Thus, the video signal is recorded with a predetermined timing when the corresponding head travels without the overlapping. However, even if the field sampling is performed, sampling is performed an odd number of times, e.g., at a ratio of 1/7 or 1/13, to thereby maintain the principle of constructing 1 frame by using heads CH1 and CH2 alternately during recording/reproducing operations.

FIGS. 4A–4C are waveform diagrams showing a recording timing chart of the 12H mode. More specifically, FIG. 4A represents a head switching pulse, FIG. 4B represents a recording stop (mute) signal, and FIG. 4C represents a recording control pulse.

Before further describing the present invention, further details regarding the time-lapse VCR of FIG. 1 will first be provided. For example, FIG. 5 is a diagram for illustrating the construction of a video head of the conventional time-lapse VCR shown in FIG. 1, which is composed of two heads which have the same azimuth angle (−6°) with a head width of 39 µm.

FIG. 6 shows the switching logic of the video head shown in FIG. 5 for recording/reproducing speeds in the recording (REC) and reproducing (PB) modes and for multi-functional modes including still, low speed (slow motion) reproducing and search modes.

FIGS. 7A–7C are diagrams for illustrating the reading out of a video signal during a 12H reproducing mode, according to the movement of each head, in servo according to FIG. 1. FIG. 7A represents the recording pattern and head position, FIG. 7B shows a head switching pulse, and FIG. 7C represents the envelope of a video signal.

Since a normal control pulse is not generated in the 12H reproducing mode, a capstan phase control operation, whereby the head follows a track, cannot proceed. Thus, as shown in FIG. 7A, the head travels on an arbitrary track. In FIG. 7C, a represents a CH2 recording signal being read out by the CH1 head, b represents a CH1 recording signal being read out by the CH1 head, c represents a CH1 recording signal being read out by the CH2 head, and d represents a CH2 recording signal being read out by the CH2 head.

FIGS. 8A–8C are diagrams for illustrating the reading out of a video signal during the still reproducing mode, according to the movement of each head in FIG. 1. In these figures, FIG. 8A represents the recording pattern and head position, FIG. 8B shows a head switching pulse, and FIG. 8C represents the envelope of a video signal.

As shown FIG. 8A, in a still reproducing mode, heads CH1 and CH2 alternately travel along one track. Since the same azimuth of two heads is used, a still field in which envelope loss is not generated can be performed as shown in FIG. 8C. In FIG. 8C, a represents a CH1 recording signal being read out by the CH1 head, and b represents a CH1 recording signal being read out by the CH2 head.

Figure 9A:
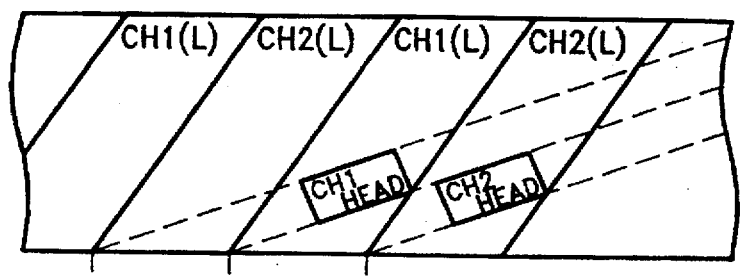
FIGS. 9A–9C are diagrams for illustrating the reading out of a video signal during a searching mode, according to the movement of each head in FIG. 1.
Figure 9B:
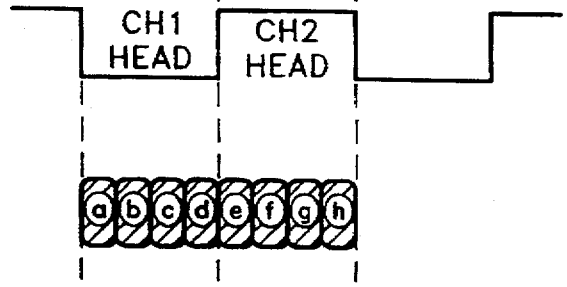
Figure 9C:

FIGS. 9A–9C are diagrams for illustrating the reading out of a video signal during a searching mode, according to the movement of each head in the conventional time-lapse VCR shown in FIG. 1. FIG. 9A represents the recording pattern and head position, FIG. 9B shows a head switching pulse, and FIG. 9C represents the envelope of a video signal.

As shown in FIG. 9A, heads CH1 and CH2 alternately travel through a plurality of neighboring tracks, in the searching mode. Since the same azimuth for the two heads is used, there is little loss of the envelope and a thin screen noise bar is generated. This case is similar to the searching mode of the dual-azimuth quad head. In FIG. 9C, a represents a CH2 recording signal being read out by the CH1 head, b represents a CH1 recording signal being read out by the CH1 head, c represents a CH2 recording signal being read out by the CH1 head, and d represents a CH1 recording signal being read out by the CH1 head.

Figure 10:
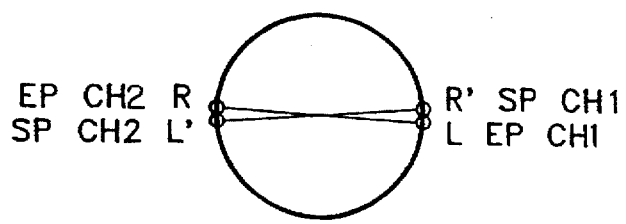
FIG. 10 is a diagram for illustrating the construction of a video head of the time-lapse VCR shown in FIG. 2.

Turning once again to describing the preferred embodiment according to the present invention, FIG. 10 is a diagram for illustrating the construction of a video head of the time-lapse VCR shown in FIG. 2, which is composed of a dual-azimuth quad head. Preferably, with respect to head widths, L' is 60 μm, L is 34 μm, R' is 50 μm and R is 34 μm. As for azimuth, R, R' are both +6° and L, L' are both −6°.

FIG. 11 shows the switching logic of the video head shown in FIG. 10 for the recording/reproducing speeds in the recording and reproducing modes and for multi-functional modes including still, slow-motion reproducing and search modes.

FIGS. 12A–12D are diagrams which are useful in explaining the read out of a video signal during a 12H reproducing mode, according to the movement of each head in the time-lapse VCR shown in FIG. 2. Preferably, FIG. 12A represents the recording pattern and head position, FIG. 12B shows a head switching pulse, FIG. 12C shows a head amplifier switching pulse, and FIG. 12D represents the envelope of a video signal.

During 12H reproduction, the azimuth head, which is the same as the recording pattern (FIG. 12A), reads the video signal using the head switching pulse (FIG. 12B) to select the channel, together with the head amplifier switching pulse (FIG. 12C) to select the head, so as to remove the azimuth loss. In FIG. 12D, a represents a CH2 recording signal being read out by the L head of CH1, b represents a CH1 recording signal being read out by the R' head of CH1, c represents a CH1 recording signal being read by the R head of CH2, and d represents a CH2 recording signal being read out by the L' head of CH2.

FIGS. 13A–13D are diagrams which find use in illustrating the read out of a video signal during a still reproducing mode, according to the movement of each head in the time-lapse VCR shown in FIG. 2. Preferably, FIG. 13A represents the recording pattern and head position, FIG. 13B shows a head switching pulse, FIG. 13C shows a head amplifier switching pulse, and FIG. 13D represents the envelope of a video signal.

During the still reproducing mode, the head azimuth head, which is the same as the recording pattern (FIG. 13A), is selected using the head amplifier switching pulse (FIG. 13C), to perform a field still operation. As a result, heads L and L' read the video signal so that a clean (low noise) still operation is possible. In FIG. 13D, a represents a CH2 recording signal being read out by the L head of CH1, and b represents a CH2 recording signal being read out by the L' head of CH2.

FIGS. 14A–14D are diagrams illustrating the read out of a video signal during a searching mode, according to the movement of each head in the time-lapse VCR shown in FIG. 2. Preferably, FIG. 14A represents the recording pattern and head position, FIG. 14B shows a head switching pulse, FIG. 14C shows a head amplifier switching pulse, and FIG. 14D represents the envelope of a video signal.

During the searching mode, while heads CH1 and CH2 alternatively travel along a plurality of neighboring tracks, the azimuth which is the same as the recording pattern (FIG. 14A) is selected by the head amplifier switching pulse. In FIG. 14D, a represents a CH1 recording signal being read out by the R' head of CH1, b represents a CH2 recording signal being read out by the L head of CH1, c represents a CH1 recording signal being read out by the R' head of CH1, and d represents a CH2 recording signal being read out by the L head of CH1.

Figure 15:
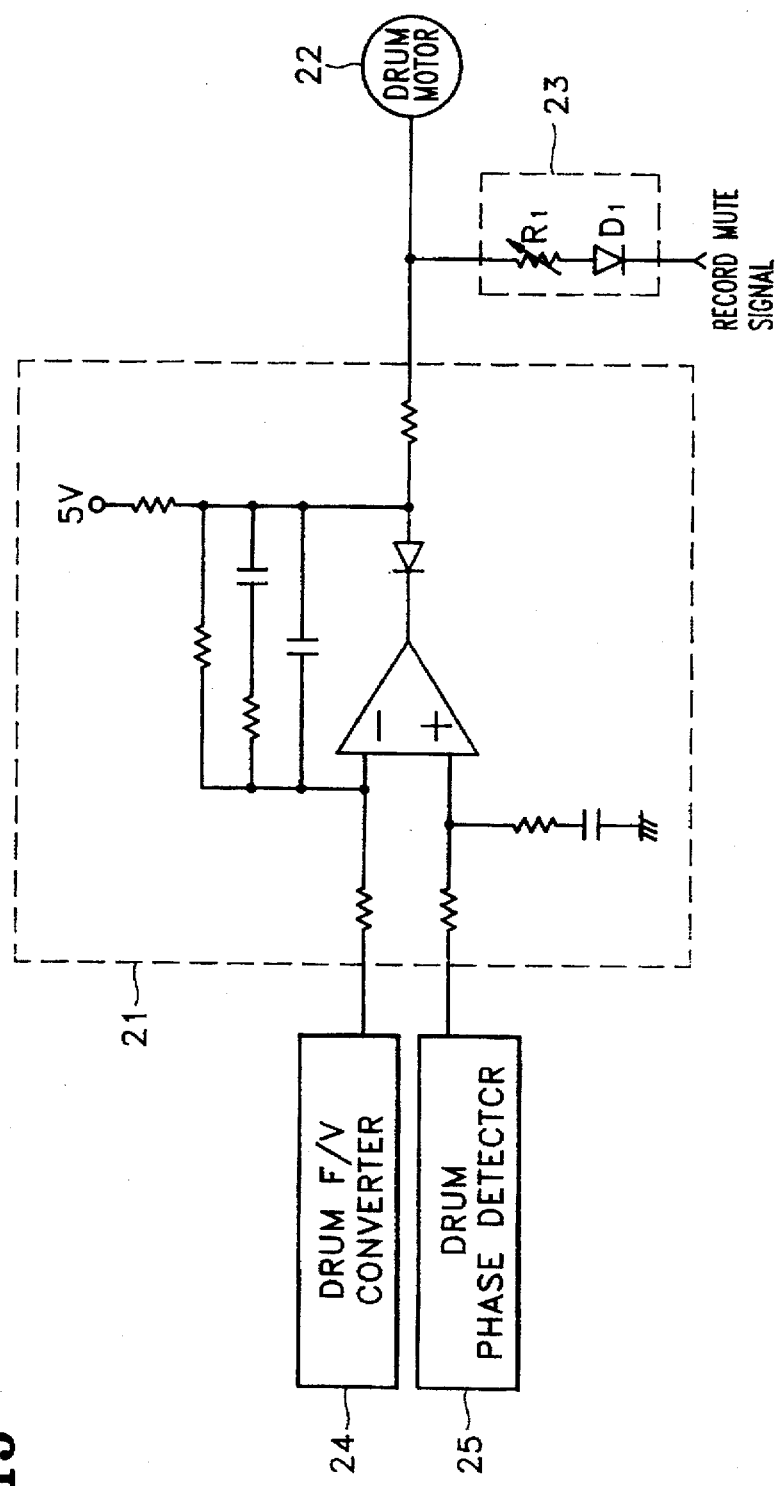
FIG. 15 is a detailed circuit diagram of $F_H$ corrector 12 during a 12H/24H recording mode in FIG. 2.

FIG. 15 is a detailed circuit diagram of the $F_H$ corrector 12, which is advantageously used during the 12H/24H recording mode in the time-lapse VCR shown in FIG. 2. Preferably, the $F_H$ corrector 12 is composed of a comparator circuit 21, which receives and compares the outputs from a drum frequency-to-voltage (F/V) converter 24 and a drum phase detector 25, and a record muting circuit 23, which is composed of a diode D1 and resistor R1 and which is connected between the output of comparator circuit 21 and the input of a drum motor 22. Preferably, the record stopping (mute) signal is applied as an input to record muting circuit 23.

During operation, diode D1 conducts in the recorded section so that the control voltage of drum motor 22 can be varied. Preferably, the amount of $F_H$ correction value is controlled by varying resistor R1. The case in which the record stop (mute) signal is active low is set as the recorded section. Advantageously, $F_H$ is set equal to 15,734 Hz.

Figure 16:
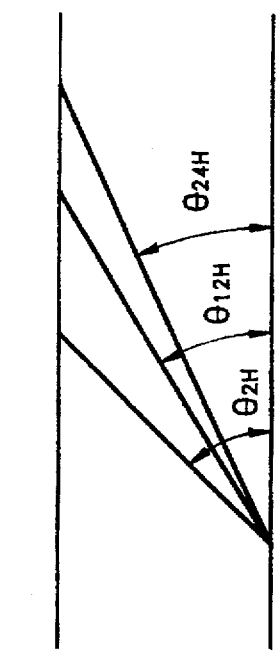
FIG. 16 is a diagram showing the travel angles of a video head during a reproduction mode in FIG. 2.

FIG. 16 is a diagram showing the travel angles of a video head according to recording modes. Preferably, $\theta_{2H}$ is the travel angle for the 2H mode, which is 5° 58' 9.8", $\theta_{12H}$ is the travel angle for the 12H mode, which is 5° 56' 27.7", and $\theta_{24H}$ is the travel angle for the 24H mode, which is 5° 56' 17.6".

Figures 17A, 17B:
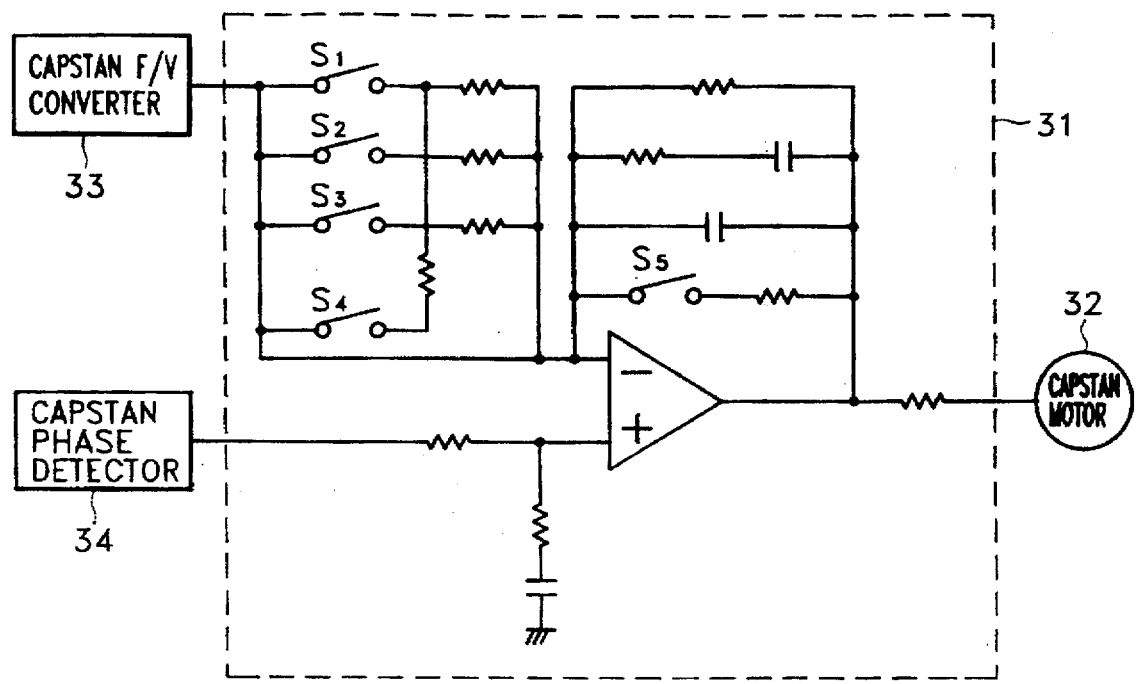
FIG. 17A is a detailed circuit diagram of the gain controller 14 of FIG. 2.
FIG. 17B shows ON/OFF states of switch according to each mode of the gain controller 14 of FIG. 17A.

FIG. 17A is a detailed circuit diagram of gain controller 14 of the time-lapse VCR according to the present invention, as shown in FIG. 2, and FIG. 17B shows the ON/OFF states of the switches of FIG. 17A according to each mode. The gain controller 14 of FIG. 17A is composed of a comparator circuit 31 for comparing the outputs of a capstan frequency-to-voltage (F/V) converter 33 and a capstan phase detector 34 and for providing the compared results to capstan motor 32, which includes a plurality of switches S1–S5.

During operation, as shown in FIG. 17B, the control gain of capstan motor 32 is governed by controlling the input impedance of comparator circuit 31 by operating switches S1–S4 and controlling the feedback impedance of comparator circuit 31 by operating switch S5. Preferably, the control gain of capstan motor 32 increases for each mode, progressing downward through FIG. 17B.

As another preferred embodiment according to the present invention, which is for improving the audio signal processing portion in the time-lapse VCR, the audio signal which is recorded as 12H or 24H using a currently used variable speech control (VSC) function can be identified by sampling and outputting the audio signal during 2H reproducing. Preferably, the VSC function is for the audio compressing process, where the audio signal is output after digital-sampling the audio signal and storing the audio signal in a memory.

As described above, the time-lapse video cassette recorder according to the present invention can be made compatible with a conventional VHS VCR, so that a stronger market can be created. Advantageously, product development time can be reduced since the same accessories and established production lines used in the conventional VHS VCR can be employed.

Advantageously, the magnetic tape recorded by the time-lapse VCR according to the present invention can be analyzed by being directly applied to a compatible device via the VHS VCR, such as a color video printer.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A time-lapse video cassette recorder, comprising:
   a video head including a dual-azimuth quad head permitting respective recording, reproducing and multi-function modes of operation;
   a control head for selectively recording and reproducing a control pulse;
   a capstan motor for moving a magnetic tape at a predetermined speed;
   a video signal processing circuit processing a video signal which is selectively recorded and reproduced by said video head;
   a servo generating a recording stop signal, a recording control pulse suitable for a time-lapse operation, a head switching pulse, a rotary switching pulse and a head amplifier switching pulse, providing a control voltage to said capstan motor, and controlling the phase of said capstan motor by reading said control pulse, wherein, in either a twelve hour (12H) reproduction mode or a 24 hour (24H) reproduction mode, said head switching pulse has a duty cycle of 50%, said head amplifier switching pulse has a duty cycle of 50%, and two cycles of said head amplifier switching pulse coincides with one cycle of said head switching pulse;
   a horizontal frequency corrector adjusting a horizontal frequency in synchronism with said recording stop signal so as to prevent a change in the horizontal frequency which is caused by deviation of a travel angle of said video head during 12H/24H recording; and
   a gain controller controlling a control gain of said capstan motor according to the rotation speed of said capstan motor.

2. The time-lapse video cassette recorder as claimed in claim 1, wherein said servo permits selection of an azimuth head from said dual-azimuth quad head which said azimuth head corresponds to a recording pattern on the magnetic tape when performing said recording, said reproducing and said multi-function modes of operation.

3. The time-lapse video cassette recorder as claimed in claim 1, wherein said servo permits tracking responsive to said head switching pulse and said head amplifier switching pulse when performing said recording, said reproducing and said multi-function modes of operation.

4. The time-lapse video cassette recorder as claimed in claim 1, wherein said recording mode of said modes of operation is a field sampling mode using said video head.

5. A time-lapse video cassette recorder as set forth in claim 1, wherein said video head comprises:
   a drum;
   a first head of a first azimuth disposed on the drum;
   a second head of a second azimuth disposed on the drum near said first head;
   a third head of the first azimuth disposed on the drum at a position 180 degrees apart from said first and second heads; and
   a fourth head of the second azimuth disposed on the drum near said third head;
   wherein said servo generates the head switching pulse and the head amplifier switching pulse so as to cause a repeating sequence of head operation in which operation of the first head is performed first, which is followed by operation of the second head, which is followed by operation of the third head, which is followed by operation of the fourth head.

6. A time-lapse video cassette recorder as set forth in claim 5, wherein said servo generates the head switching pulse and the head amplifier switching pulse to cause the repeating sequence of head operation to occur in response to the control pulse so as to produce an optimum video signal.

7. A time-lapse video cassette recorder, comprising:
   video head means including a dual-azimuth quad head for respectively recording, reproducing and performing multi-function modes of operation;
   control head means for selectively recording and reproducing a control pulse;
   capstan motor means for moving a magnetic tape at predetermined speeds;
   video signal processing means for processing a video signal which is selectively recorded and reproduced by said video head means;
   servo means for generating a recording stop signal, a recording control pulse suitable for a time-lapse operation, a head switching pulse, a rotary switching pulse and a head amplifier switching pulse, for providing a control voltage to said capstan motor means, and for controlling the phase of said capstan motor means by reading said control pulse, wherein, in either a twelve hour (12H) reproduction mode or a 24 hour (24H) reproduction mode, said head switching pulse has a duty cycle of 50%, said head amplifier switching pulse has a duty cycle of 50%, and two cycles of said head amplifier switching pulse coincides with one cycle of said head switching pulse;
   horizontal frequency corrector means for adjusting a horizontal frequency in synchronism with said recording stop signal so as to prevent a change in the horizontal frequency which is caused by deviation of a travel angle of said video head means during 12H/24H recording; and
   gain controller means for controlling gain of said capstan motor means according to rotation speed of said capstan motor means.

8. The time-lapse video cassette recorder as claimed in claim 7, wherein said servo means for permitting selection of an azimuth head from said dual-azimuth quad head corresponding to a recording pattern on the magnetic tape during recording, reproducing and performing said multi-function modes of operation.

9. The time-lapse video cassette recorder as claimed in claim 7, wherein said servo means comprises means for tracking tracks on the magnetic tape responsive to said head switching pulse and said head amplifier switching pulse when recording, reproducing and performing said multi-function modes of operation.

10. The time-lapse video cassette recorder as claimed in claim 7, wherein said recording includes field sampling.

11. A time-lapse video cassette recorder, comprising:
    a video head including a dual-azimuth quad head permitting respective recording, reproducing and multi-function modes of operation;
    a control head for selectively recording and reproducing a control pulse;

a capstan motor for moving a magnetic tape at a predetermined speed;

a video signal processing circuit processing a video signal which is selectively recorded and reproduced by said video head; and a servo generating a recording stop signal, a recording control pulse suitable for a time-lapse operation, a head switching pulse, a rotary switching pulse and a head amplifier switching pulse, providing a control voltage to said capstan motor, and controlling the phase of said capstan motor by reading said control pulse, wherein, during a still reproducing mode said head switching pulse has a duty cycle of 50% and said head amplifier switching pulse has a duty cycle of 50%, and a cycle of said head amplifier switching pulse coincides with a cycle of said head switching pulse.

12. A time-lapse video cassette recorder as set forth in claim 11, wherein said video head comprises:

a drum;

a first head of a first azimuth disposed on the drum;

a second head of a second azimuth disposed on the drum near said first head;

a third head of the first azimuth disposed on the drum at a position 180 degrees apart from said first and second heads; and a fourth head of the second azimuth disposed on the drum near said third head; and wherein said servo generates the head switching pulse and the head amplifier switching pulse so as to cause one of the following head activation sequences to occur: 1) a first repeating sequence whereby said third head operates after said first head ceases to operate, and said first head operates after said third head ceases to operate, and 2) a second repeating sequence whereby said fourth head operates after said second head ceases to operate, and said second head operates after said fourth head ceases to operate.

13. A time-lapse video cassette recorder as set forth in claim 12, wherein said servo generates the head switching pulse and the head amplifier switching pulse to cause one of the first repeating sequence and the second repeating sequence of head operation to occur in response to the control pulse so as to produce an optimum video signal.

14. A time-lapse video cassette recorder, comprising:

a video head including a dual-azimuth quad head permitting respective recording, reproducing and multifunction modes of operation;

a control head for selectively recording and reproducing a control pulse;

a capstan motor for moving a magnetic tape at a predetermined speed;

a video signal processing circuit processing a video signal which is selectively recorded and reproduced by said video head; and a servo generating a recording stop signal, a recording control pulse suitable for a time-lapse operation, a head switching pulse, a rotary switching pulse and a head amplifier switching pulse, providing a control voltage to said capstan motor, and controlling the phase of said capstan motor by reading said control pulse, wherein during a search reproducing mode said head switching pulse has a duty cycle of 50% and said head amplifier switching pulse has a duty cycle of 50%, and four cycles of said head amplifier switching pulse coincide with one cycle of said head switching pulse.

15. A time-lapse video cassette recorder as set forth in claim 14, wherein said video head comprises:

a drum;

a first head of a first azimuth disposed on the drum;

a second head of a second azimuth disposed on the drum near said first head;

a third head of the first azimuth disposed on the drum at a position 180 degrees apart from said first and second heads; and a fourth head of the second azimuth disposed on the drum near said third head;

wherein, said servo generates the head switching pulse and the head amplifier switching pulse so as to cause a repeating sequence of head operation in which operation of the first head is performed first, which is followed by operation of the second head, which is followed by operation of the first head, which is followed by operation of the second head, which is followed by operation of the third head, which is followed by operation of the fourth head, which is followed by operation of the third head, which is followed by operation of the fourth head.

16. A time-lapse video cassette recorder as set forth in claim 15, wherein said servo generates the head switching pulse and the head amplifier switching pulse to cause the repeating sequence of head operation to occur in response to the control pulse so as to produce an optimum video signal.

* * * * *